United States Patent
Hirano

(10) Patent No.: US 9,084,980 B2
(45) Date of Patent: Jul. 21, 2015

(54) ZEOLITE FOR TREATMENT OF NONAQUEOUS ELECTROLYTIC SOLUTION AND TREATMENT METHOD OF NONAQUEOUS ELECTROLYTIC SOLUTION

(75) Inventor: Shigeru Hirano, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 144 days.

(21) Appl. No.: 13/383,016

(22) PCT Filed: Aug. 18, 2010

(86) PCT No.: PCT/JP2010/063932
§ 371 (c)(1),
(2), (4) Date: Jan. 9, 2012

(87) PCT Pub. No.: WO2011/024687
PCT Pub. Date: Mar. 3, 2011

(65) Prior Publication Data
US 2012/0141868 A1   Jun. 7, 2012

(30) Foreign Application Priority Data

Aug. 28, 2009  (JP) .................................. 2009-197802

(51) Int. Cl.
| | |
|---|---|
| *H01M 6/14* | (2006.01) |
| *B01J 20/18* | (2006.01) |
| *B01D 15/00* | (2006.01) |
| *C01B 39/14* | (2006.01) |
| *H01M 6/16* | (2006.01) |
| *H01M 10/0566* | (2010.01) |
| *C01B 39/22* | (2006.01) |
| *C01B 39/38* | (2006.01) |
| *C01B 39/44* | (2006.01) |
| *C01B 39/46* | (2006.01) |
| *H01M 10/0567* | (2010.01) |

(52) U.S. Cl.
CPC ............... *B01J 20/186* (2013.01); *B01D 15/00* (2013.01); *B01J 20/183* (2013.01); *C01B 39/14* (2013.01); *C01B 39/22* (2013.01); *C01B 39/38* (2013.01); *C01B 39/44* (2013.01); *C01B 39/46* (2013.01); *H01M 6/162* (2013.01); *H01M 10/0566* (2013.01); *H01M 6/168* (2013.01); *H01M 10/0567* (2013.01)

(58) Field of Classification Search
CPC ....................................................... H01M 6/14
USPC ......................................................... 429/188
See application file for complete search history.

(56) References Cited

U.S. PATENT DOCUMENTS

| | | | |
|---|---|---|---|
| 5,728,489 A * | 3/1998 | Gao et al. ....................... 429/309 |
| 2002/0122986 A1 | 9/2002 | Labarge | |
| 2007/0189946 A1 | 8/2007 | Ivanov et al. | |
| 2010/0003178 A1 | 1/2010 | Tokunaga et al. | |
| 2011/0136657 A1 | 6/2011 | Takamitsu et al. | |
| 2011/0251048 A1 | 10/2011 | Ariga et al. | |

FOREIGN PATENT DOCUMENTS

| | | | |
|---|---|---|---|
| CA | 2285007 | * | 9/1999 |
| JP | 58-028174 | | 2/1983 |
| JP | 59-081869 | | 5/1984 |
| JP | 59-224071 | | 12/1984 |
| JP | 07-235309 | | 9/1995 |
| JP | 07-262999 | | 10/1995 |
| JP | 2002-001107 | * | 1/2002 |
| JP | 2002-3215 | | 1/2002 |
| JP | 2007-169262 | | 7/2007 |
| JP | 2008-251528 | | 10/2008 |
| WO | WO9844576 A1 | * | 10/1998 |

OTHER PUBLICATIONS

Search report from International Application No. PCT/JP2010/063932, mail date is Nov. 16, 2010.
China Office action, dated May 6, 2013 along with an English translation thereof.
China Office action, dated Jan. 15, 2014 along with an English translation thereof.
Japan Office action, dated Feb. 4, 2014 along with an English translation thereof.
Japan Office action, dated Jul. 8, 2014 along with an English translation thereof.
China Office action, dated Jun. 30, 2014 along with an English translation thereof.

* cited by examiner

*Primary Examiner* — Stewart Fraser
*Assistant Examiner* — Olatunji Godo
(74) *Attorney, Agent, or Firm* — Greenblum & Bernstein, P.L.C.

(57) ABSTRACT

An object of the present invention is to provide a zeolite enabling a dehydration treatment of a nonaqueous electrolytic solution without causing a problem of elution of sodium from the zeolite at the time of dehydrating a nonaqueous electrolytic solution for a lithium battery by using a zeolite. The present invention relates to a zeolite, wherein from 97.5 to 99.5 mol % of the ion-exchangeable cation is ion-exchanged with lithium, and when this zeolite is used, a nonaqueous electrolytic solution can be dehydrated while keeping the elution of a cation impurity such as sodium down to 50 ppm or less. As for the zeolite species, at least one or more zeolites selected from the group consisting of A-type, chabazite, ferrierite, ZSM-5 and clinoptilolite can be used.

6 Claims, No Drawings

ZEOLITE FOR TREATMENT OF NONAQUEOUS ELECTROLYTIC SOLUTION AND TREATMENT METHOD OF NONAQUEOUS ELECTROLYTIC SOLUTION

TECHNICAL FIELD

The present invention relates to a novel zeolite for treatment of a nonaqueous electrolytic solution and a treatment method of a nonaqueous electrolytic solution.

BACKGROUND ART

In the case of using a nonaqueous electrolytic solution such as electrolytic solution for plating with a metal ion unstable in an aqueous solution system, electrolytic solution for lithium and other batteries, and electrolytic solution for capacitor, it is very important to remove impurities in the nonaqueous electrolytic solution. In these uses, the water amount in the nonaqueous electrolytic solution needs to be 50 ppm or less. Therefore, in use as a nonaqueous electrolytic solution, the solution must be previously subjected to a dehydration treatment.

Among others, in a lithium secondary battery, when water is present in the nonaqueous electrolytic solution, not only the negative electrode performance of the battery is reduced but also decomposition of the electrolyte salt in the nonaqueous electrolytic solution is accelerated. Therefore, removal of water in the nonaqueous electrolytic solution is a very important task.

Examples of the dehydration treatment method of the nonaqueous electrolytic solution, which has been heretofore proposed, include a method of separately drying a nonaqueous solvent and an electrolyte and then mixing both to prepare a nonaqueous electrolytic solution, a method of azeotropically dehydrating a mixture of a nonaqueous solvent and an electrolyte (Patent Document 1), a method of dehydrating a mixture of a nonaqueous solvent and an electrolyte by a zeolite (Patent Document 2), and a method comprising a combination thereof (Patent Document 3). These dehydration treatment methods are technically classified roughly into two groups, that is, 1) a method of performing dehydration of a nonaqueous electrolytic solution by distillation or drying, and 2) a method of performing dehydration of a nonaqueous electrolytic solution by using a zeolite.

The method of 1) includes a method of separately drying a nonaqueous solvent and an electrolyte and then mixing both to prepare a nonaqueous electrolytic solution, and a method of azeotropically dehydrating a nonaqueous electrolytic solution in the state of an electrolyte being dissolved in a nonaqueous solvent. In the former case, water is liable to be mixed in the course of mixing the nonaqueous solvent and the electrolyte, whereas in the azeotropic dehydration of the latter case, it is difficult to sufficiently remove water in the nonaqueous electrolytic solution. Therefore, in both methods, the water amount in the nonaqueous electrolytic solution can be hardly reduced to 50 ppm or less.

The method of 2) is a method of removing water in the nonaqueous electrolytic solution by utilizing water adsorption capacity of a zeolite. However, an ion-exchangeable cation is present in the zeolite, and lithium ion in the nonaqueous electrolytic solution and the cation in the zeolite cause an ion exchange reaction during the dehydration treatment. Therefore, in this method, although water in the nonaqueous electrolytic solution may be removed, a cation in the zeolite elutes as an impurity into the nonaqueous electrolytic solution and contaminates the nonaqueous electrolytic solution after removal of water.

As a technique to solve this problem, a method of previously ion-exchanging the ion-exchangeable cation in the zeolite with a cation which does not become a contamination source, for example, in the case of a nonaqueous electrolytic solution for lithium battery, a method of ion-exchanging the zeolite with a cation except for sodium, has been proposed (Patent Documents 2, 4 and 5). However, although the ion-exchangeable cation is previously exchanged with lithium, in the case of dehydrating the nonaqueous electrolytic solution by using a lithium substitution-type zeolite where sodium remains, the ion-exchangeable cation in the zeolite is not completely ion-exchanged with lithium ion and therefore, the problem of causing elution of the sodium ion into the nonaqueous electrolytic solution from the zeolite cannot be avoided (Patent Document 3). On the other hand, for completely ion-exchanging the ion-exchangeable cation in the zeolite with lithium, a very large amount of high-purity lithium is required. In turn, a zeolite where the ion-exchangeable cation is completely exchanged with lithium ion is expensive.

In addition, a method of keeping the electrolytic solution from contacting with the zeolite for a long time and thereby suppressing the ion exchange reaction between the cation in the zeolite and the ion in the electrolytic solution (Patent Document 3) has been proposed as the method for dehydrating the nonaqueous electrolytic solution by using a zeolite. However, in such a dehydration method, the process is complicated.

In this way, despite the attempts to enhance the dehydration capacity in the method for dehydrating the nonaqueous electrolytic solution by using a zeolite, conventional methods have a problem of sodium elution from the zeolite or a problem of the complicated process. For this reason, there is not known a zeolite for treatment of a nonaqueous electrolytic solution, which involves no sodium elution and enables dehydration treatment of the nonaqueous electrolytic solution by a simple process.

RELATED ART

Patent Document

Patent Document 1: JP-A-58-28174
Patent Document 2: JP-A-59-224071
Patent Document 3: JP-A-07-235309
Patent Document 4: JP-A-2002-1107
Patent Document 5: JP-A-59-81869

SUMMARY OF THE INVENTION

Problems that the Invention is to Solve

An object of the present invention is to provide an industrially useful zeolite for treatment of a nonaqueous electrolytic solution, which can remove water without causing elution of sodium into the nonaqueous electrolytic solution.

Means for Solving the Problems

As a result of intensive studies to attain the above-described object, the present inventors have found that a zeolite where 97.5 to 99.5 mol % of the ion-exchangeable cation is ion-exchanged with lithium can perform, at the time of dehydrating a nonaqueous electrolytic solution, a dehydration treatment while neither causing elution of a cation except for lithium, particularly elution of sodium, despite remaining of an ion-exchangeable cation except for lithium in the zeolite, nor causing contamination of the nonaqueous electrolytic solution. Based on the finding, the present inventors have achieved the present invention.

That is, the gist of the present invention resides in the following (1) to (7).

(1) A zeolite for treatment of a nonaqueous electrolytic solution, wherein from 97.5 to 99.5 mol % of the ion-exchangeable cation is ion-exchanged with lithium.

(2) The zeolite for treatment of a nonaqueous electrolytic solution as described in (1) above, wherein preferably, from 98.0 to 99.0 mol % of the ion-exchangeable cation is ion-exchanged with lithium.

(3) The zeolite for treatment of a nonaqueous electrolytic solution as described in (1), wherein preferably, the zeolite is at least one or more zeolites selected from the group consisting of A-type, chabazite, ferrierite, ZSM-5 and clinoptilolite.

(4) A zeolite shaped body for treatment of a nonaqueous electrolytic solution, obtained by shaping the zeolite for treatment of a nonaqueous electrolytic solution described in (1) above.

(5) The zeolite shaped body for treatment of a nonaqueous electrolytic solution as described in (4) above, preferably containing 95 wt % or more of the zeolite for treatment of a nonaqueous electrolytic solution.

(6) A production method of a nonaqueous electrolytic solution, comprising contacting a nonaqueous electrolytic solution with the zeolite for treatment of a nonaqueous electrolytic solution described in (1) above, the zeolite shaped body for treatment of a nonaqueous electrolytic solution described in (4) above, or both thereof.

(7) A lithium battery containing the zeolite for treatment of a nonaqueous electrolytic solution described in (1) above, the zeolite shaped body for treatment of a nonaqueous electrolytic solution described in (4) above, or both thereof, and a nonaqueous electrolytic solution.

Advantage of the Invention

The zeolite for treatment of a nonaqueous electrolytic solution of the present invention and the shaped body thereof can be used for a dehydration treatment of a nonaqueous electrolytic solution without causing a problem of elution of a cation except for lithium, such as sodium, despite incomplete ion exchange of the exchangeable cation in the zeolite with lithium.

MODE FOR CARRYING OUT THE INVENTION

In the zeolite for treatment of a nonaqueous electrolytic solution of the present invention, from 97.5 to 99.5 mol %, preferably from 98.0 to 99.5 mol %, still more preferably from 98.0 to 99.0 mol %, of the ion-exchangeable cation is ion-exchanged with lithium.

Incidentally, in the present invention, the ratio of the exchangeable cation in the zeolite accounted for by lithium is referred to as "lithium ion-exchange ratio".

The exchangeable cation remaining in the zeolite other than lithium is not particularly limited. Sodium or other alkali metal cations, an alkaline earth metal cation, a proton and the like may remain.

If the lithium ion-exchange ratio is less than 97.5 mol %, when a nonaqueous electrolytic solution is treated with such a zeolite, elution of the exchangeable cation other than lithium in the zeolite increases and particularly, elution of sodium into the nonaqueous electrolytic solution rapidly increases. Therefore, when a dehydration treatment of a nonaqueous electrolytic solution is performed using the zeolite, sodium in excess of 50 ppm that is a sodium concentration unusable as a nonaqueous electrolytic solution for battery is eluted into the nonaqueous electrolytic solution from the zeolite.

On the other hand, it is known that in a zeolite having a cation other than lithium, a reaction of letting the cation other than lithium be completely ion-exchanged with lithium proceeds hardly at all. In particular, ion exchanging in a lithium ion-exchange ratio over 99.5 mol % requires an extremely large amount of lithium. For this reason, the lithium ion-exchange amount of the zeolite of the present invention is 99.5 mol % or less, preferably 99.0 mol % or less.

Furthermore, when the lithium ion-exchange ratio in the zeolite is from 98.0 to 99.0 mol %, in performing a dehydration treatment of a nonaqueous electrolytic solution by using the zeolite, elution of a cation such as sodium from the zeolite does not occur and not only the water in the nonaqueous electrolytic solution can be removed but also a free acid can be advantageously removed at a high ratio.

The free acid as used herein means an acid such as hydrogen fluoride produced resulting from decomposition or the like of the electrolyte in the nonaqueous electrolytic solution.

As to the kind (crystal form) of the zeolite for treatment of a nonaqueous electrolytic solution of the present invention, at least one or more zeolites selected from the group consisting of A-type, chabazite, ferrierite, ZSM-5 and clinoptilolite are preferred, and an A-type zeolite is more preferred. The reason why these zeolites are suitable as a zeolite for treatment of a nonaqueous electrolytic solution is not clearly known, but these zeolites have as small a pore size as about 6 Å or less and among others, the A-type zeolite has a 8-membered ring pore structure giving a smaller pore size of 4 Å. Accordingly, it is considered that a nonaqueous solvent of the nonaqueous electrolytic solution, which is solvated with the lithium ion, can hardly intrude into pores of the zeolite and in turn, the nonaqueous solvent can be free from a chemical change.

The form of the zeolite for treatment of a nonaqueous electrolytic solution of the present invention may be an arbitrary form such as powder or shaped body, but a shaped body that is easy to handle is preferred.

In the case of forming a zeolite shaped body, the shaping is preferably performed by adding a binder.

Examples of the general binder for use in the shaping include silica, alumina and clay, and a binder having a small sodium content is preferred. Examples of such a binder which can be used include kaolin-type, bentonite-type, talc-type, pyrophyllite-type, molysite-type, vermiculite-type, montmorillonite-type, chlorite-type and halloysite-type clays.

The binder is not particularly limited in its amount added but is preferably added in an amount of 10 to 50 parts by weight per 100 parts by weight of a powdered zeolite (hereinafter, referred to as a zeolite powder). If the amount of the binder added is less than 10 parts by weight per 100 parts by weight of the zeolite powder, the zeolite shaped body may collapse during use, whereas if it exceeds 50 parts by weight, the dehydration capacity becomes insufficient.

In the case of forming the zeolite as a shaped body by using a binder, the binder in the shaped body is preferably converted into a zeolite (formation of a binderless zeolite) by caustic digestion. By this conversion, the proportion of zeolite contained in the zeolite shaped body can be increased and ultimately, the zeolite shaped body can be composed entirely of zeolite.

In a shaped body where the binder is partially or entirely converted into a binderless zeolite, the zeolite content in the shaped body is preferably 95% or more, more preferably 100%. Thanks to a high zeolite content in the shaped body, the dehydration efficiency in the treatment of the nonaqueous electrolytic solution is increased.

The shape of the shaped body is not particularly limited, and examples thereof include spherical, cylindrical, trefoil, elliptical and hollow shapes. The size of the shaped body is not particularly limited and may be, for example, approximately from 0.3 to 5 mm in terms of the diameter of a spherical or cylindrical shape.

The production method of the zeolite for treatment of a nonaqueous electrolytic solution of the present invention is not particularly limited as long as the lithium ion-exchange ratio is from 97.5 to 99.5 mol %.

In order to efficiently exchange the exchangeable cation in the zeolite with lithium ion, the ion exchanging is preferably performed not by the inefficient batch ion-exchange method but by a flow-type ion-exchange method of flowing an aqueous lithium salt solution on the zeolite and continuously discharging a cation such as sodium which has been ion-exchanged with lithium from a system. It is more preferred to use an aqueous lithium salt solution by circulating it, so that the lithium ion-exchange ratio in the entire zeolite can be made uniform.

The lithium salt used in the aqueous lithium salt solution is not particularly limited as long as it is water-soluble, and examples thereof include lithium nitrate, lithium sulfate, lithium carbonate, lithium hydroxide and lithium chloride.

The lithium concentration of the aqueous lithium salt solution is not particularly limited but is preferably 1 mol % or more.

The zeolite for treatment of a nonaqueous electrolytic solution of the present invention, the zeolite shaped body for treatment of a nonaqueous electrolytic solution of the present invention, or both thereof (hereinafter, referred to as the "zeolite and the like for treatment of a nonaqueous electrolytic solution") are contacted with a nonaqueous electrolytic solution, whereby a highly dehydrated nonaqueous electrolytic solution can be produced. Furthermore, thanks to the zeolite and the like for treatment of a nonaqueous electrolytic solution of the present invention, a fully dehydrated nonaqueous electrolytic solution sufficiently deprived of a free acid can be produced.

The kind of the nonaqueous electrolytic solution which can be treated with the zeolite and the like for treatment of a nonaqueous electrolytic solution of the present invention is not particularly limited as long as it is a nonaqueous electrolytic solution. Examples of the nonaqueous electrolytic solution include those prepared by dissolving at least one or more salts selected from a lithium salt such as lithium perchlorate, lithium tetrafluoroborate, lithium hexafluorophosphate and trifluoromethanesulfonic acid, a quaternary ammonium salt and the like, in at least one or more kinds of organic solvents selected from carbonates such as dimethyl carbonate and diethyl carbonate, sulfolanes such as sulfolane and dimethylsulfoxide, lactones such as γ-butyrolactone, and ethers such as dimethylsulfoxide.

In the case of performing a dehydration treatment of a nonaqueous electrolytic solution by using the zeolite and the like for treatment of a nonaqueous electrolytic solution of the present invention, it is preferred to previously remove water in the zeolite (dehydration treatment of zeolite). The method for dehydrating the zeolite is not particularly limited as long as the method and the conditions can let water be removed from the zeolite. Considering heat resistance of the zeolite itself, water is preferably removed at as low a temperature as possible, and it is more preferred to heat-treat the zeolite at a temperature of 600° C. or less for 1 to 5 hours in a dry atmosphere.

The method for dehydrating a nonaqueous electrolytic solution by using the zeolite and the like for treatment of a nonaqueous electrolytic solution of the present invention is not particularly limited as long as it is a method comprising contacting a nonaqueous electrolytic solution with the zeolite, and examples thereof include a method of flowing a nonaqueous electrolytic solution through a column packed with the zeolite and the like for treatment of a nonaqueous electrolytic solution of the present invention, and a method of dipping the zeolite and the like for treatment of a nonaqueous electrolytic solution of the present invention in a nonaqueous solution prepared, followed by still standing or stirring.

In the nonaqueous electrolytic solution dehydrated with the zeolite and the like for treatment of a nonaqueous electrolytic solution of the present invention, the sodium concentration is preferably 50 ppm or less, more preferably 40 ppm or less.

The zeolite and the like for treatment of a nonaqueous electrolytic solution of the present invention may be also used by adding it to a nonaqueous electrolytic solution in a lithium battery.

EXAMPLES

The present invention is described below by referring to Examples, but the present invention is not limited to these Examples.

(Lithium Ion-Exchange Ratio)

A zeolite after lithium ion exchange was dissolved, and each of the lithium concentration, sodium concentration and potassium concentration in the zeolite was quantitatively determined by ICP measurement. The total of the quantitatively determined lithium concentration, sodium concentration and potassium concentration was obtained in terms of molar concentration, and the ratio of the lithium concentration to the concentration obtained was calculated in mol % and used as the lithium ion-exchange ratio.

(Sodium Elution Property)

The elution property of sodium from the zeolite was evaluated by dipping the zeolite in an aqueous lithium salt solution having a high concentration. That is, a test of accelerating sodium elution from the zeolite was performed by placing the zeolite in an environment where sodium in the zeolite is readily ion-exchanged with lithium in the aqueous lithium salt solution. From the amount of sodium eluted in such an environment, the maximum sodium elution concentration during elution into a nonaqueous electrolytic solution was estimated.

Specifically, an aqueous 2 mol/L lithium chloride solution (prepared using a reagent with a purity of 99.0% or more produced by Kishida Chemical Co., Ltd.) was used as the aqueous lithium salt solution. In 100 g of the aqueous solution, 10 g of a zeolite shaped body subjected to a dehydration treatment was dipped, and the solution was stirred at 30° C. and 180 rpm for 1 hour. The aqueous solution after stirring was filtered through a membrane filter to remove fine powder, and the sodium concentration of the aqueous solution after the filtration was quantitatively determined by ICP measurement, whereby the sodium elution concentration was measured.

Incidentally, the sodium concentration in the aqueous 2 mol/L lithium chloride solution before measuring the sodium elution concentration, that is, before evaluating the sodium elution property, was 0.2 ppm.

Example 1

100 Parts by weight of sodium A-type zeolite was mixed and kneaded with 25 parts by weight of kaolin clay, 4 parts by weight of CMC (carboxymethyl cellulose) and water to make a cylindrical shaped body having a diameter of 1.5 mm. The shaped body was dried and fired at 600° C. for 3 hours in a box furnace.

The fired shaped body was packed in a column, and a aqueous 6% sodium hydroxide solution was flowed therethrough at 80° C. to convert the clay into an A-type zeolite (formation of a binderless zeolite). In the shaped body after the formation of a binderless zeolite, 95% or more was zeolite.

Subsequently, the aqueous sodium hydroxide solution in the column was removed by water washing, and lithium ion exchange of the zeolite shaped body was performed. In the lithium ion exchange, an aqueous 4 mol/L lithium chloride solution in an amount of 15 equivalents was flowed at 80° C. by one-path flow, thereby contacting the zeolite with the aqueous lithium chloride solution, and finally, the aqueous lithium chloride solution was circulated. By this circulation, the lithium ion-exchange ratio in the zeolite shaped body was homogenized. The zeolite shaped body after lithium ion exchange was washed with water, dried at 70° C. and then fired at 500° C. for 3 hours to perform the dehydration treatment of the zeolite.

The lithium ion-exchange ratio in the lithium ion-exchanged A-type zeolite shaped body obtained was 99.0 mol %, and the remaining cation was sodium.

The sodium elution concentration was measured using the zeolite shaped body, as a result, the sodium concentration in the aqueous lithium salt solution after the treatment was 33 ppm.

Example 2

The same treatment as in Example 1 was performed except for changing the amount of the aqueous 4 mol/L lithium chloride solution flowed to 25 equivalents and the lithium ion-exchange ratio to 99.5 mol %. The sodium concentration in the aqueous lithium salt solution after the treatment was 18 ppm.

Comparative Example 1

The same treatment as in Example 1 was performed except for changing the amount of the aqueous 4 mol/L lithium chloride solution flowed to 10 equivalents and the lithium ion-exchange ratio to 97.0 mol %. The sodium concentration in the aqueous lithium salt solution after the treatment was 103 ppm and greatly increased as compared with the sodium concentration (0.2 ppm) in the aqueous lithium salt solution before measuring the sodium elution concentration.

Comparative Example 2

An LSX-type zeolite containing sodium and potassium was used as the zeolite. Also, in the formation of a binderless zeolite, a mixed solution of an aqueous 8% sodium hydroxide solution and 1% $SiO_2$ was used in place of the aqueous 6% sodium hydroxide solution, and this mixed solution was flowed through the zeolite at 90° C. to convert the binder into an X-type zeolite. The treatment was performed in the same manner as in Example 1 except for changing the amount of the aqueous lithium chloride solution passed at the lithium ion exchange to 6 equivalents.

The lithium ion-exchange ratio in the lithium exchanged LSX-type zeolite shaped body was 96.0 mol %, and the remaining cation was sodium and potassium.

The sodium elution concentration was measured using the zeolite shaped body, as a result, the sodium concentration in the aqueous lithium salt solution after the treatment was 130 ppm and greatly increased as compared with the sodium concentration (0.2 ppm) in the aqueous lithium salt solution before measuring the sodium elution concentration.
(Removal of Water, Removal of Free Acid and Cation Elution Property Using Nonaqueous Electrolytic Solution)

Example 3

10 Gram of the lithium ion-exchanged A-type zeolite (lithium ion-exchange ratio: 99.0 mol %) obtained in Example 1 was dipped in 100 g of a commercially available nonaqueous electrolytic solution for lithium battery (1 mol/L-LiPF$_6$, ethylene carbonate:dimethyl carbonate=1:2 by volume, produced by Kishida Chemical Co., Ltd.) and left statically at room temperature for 24 hours, thereby performing a dehydration treatment of the nonaqueous electrolytic solution, and the nonaqueous electrolytic solution after the treatment was recovered. The water concentration of the obtained nonaqueous electrolytic solution was quantitatively determined by Karl Fischer measurement, and the cation concentration was quantitatively determined by ICP measurement.

Also, the free acid concentration of the nonaqueous electrolytic solution was quantitatively determined by the following titration method. That is, 10 ml of the nonaqueous electrolytic solution subjected to the dehydration treatment was weighed and after precise weighing, 100 ml of pure water cooled to about 0° C. was added to the nonaqueous electrolytic solution subjected to the dehydration treatment, to make a solution for titration. The temperature of the solution for titration was set to be from 0 to 5° C., and an aqueous 0.1 mol/L sodium hydroxide solution was dropped to determine the neutral point.

Incidentally, bromothymol blue powder was used as an indicator indicating the neutral point of titration. The point where the color of the titration solution having added thereto the indicator was changed from orange to blue-violet and the blue-violet color continued for 5 seconds, was takes as the neutral point. From the obtained neutral point, the free acid concentration was determined as the concentration in terms of hydrogen fluoride according to the following formula:

Free acid concentration (ppm)=dropping amount (ml) of aqueous 0.1 mol/L sodium hydroxide solution required until neutral point×molecular amount of hydrogen fluoride×100/weight (g) of nonaqueous electrolytic solution Here, the molecular weight of hydrogen fluoride was set to 20 g/mol.

Incidentally, in the nonaqueous electrolytic solution before the dehydration treatment, the water concentration was 124 ppm, the free acid concentration was 54 ppm, and sodium and potassium were not detected.

The measurement results of the nonaqueous electrolytic solution after dipping the zeolite for 24 hours to effect a dehydration treatment are shown in Table 1. In Table 1, the water removal percentage and the free acid removal percentage indicate respective ratios at which the water concentration and the free acid concentration in the nonaqueous electrolytic solution after dehydration treatment were changed from those before the dehydration treatment. In this connection, a larger value indicates that water or the free acid is more removed. In turn, a larger value indicates that the dehydration property or free acid removal property of the zeolite and the like for nonaqueous electrolytic solution of the present invention is higher.

In this Example, cation elution from the zeolite into the nonaqueous electrolytic solution was not caused, and water removal and free acid removal from the nonaqueous electrolytic solution were attained. Also, in the dehydration treatment using the zeolite, particularly the free acid removal percentage in the nonaqueous electrolytic solution was high.

Example 4

A treatment was performed in the same manner as in Example 1 except for using industrial lithium chloride (lithium purity: 99.5 mol %) as the aqueous lithium chloride solution used for lithium ion exchange. The lithium ion-exchange ratio in the obtained lithium ion-exchanged A-type zeolite was 98 mol %, and the remaining cation was 1 mol % of sodium and 1 mol % of potassium.

A dehydration treatment of the nonaqueous electrolytic solution was performed under the same conditions as in Example 3 by using the zeolite above. The results are shown in Table 1. Cation elution from the zeolite into the nonaqueous electrolytic solution was not caused, and water removal and free acid removal from the nonaqueous electrolytic solution were achieved. Also, in the dehydration treatment using the zeolite, the free acid removal percentage in the nonaqueous electrolytic solution was high.

Example 5

The process until formation of a binderless zeolite was performed in the same manner as in Example 1, and 25 equivalents of an aqueous 4 mol/L lithium chloride solution was contacted with zeolite at 80° C. to effect lithium ion exchange. The zeolite shaped body after the lithium ion exchange was washed with water, dried at 70° C. and then fired at 500° C. for 3 hours to perform a dehydration treatment of the zeolite. The lithium ion-exchange ratio in the lithium ion-exchanged A-type zeolite shaped body obtained was 99.4 mol %, and the remaining cation was sodium.

A dehydration treatment of the nonaqueous electrolytic solution was performed under the same conditions as in Example 3 by using the zeolite above. The results are shown in Table 1. Cation elution from the zeolite into the nonaqueous electrolytic solution was not caused, and water removal and free acid removal from the nonaqueous electrolytic solution were achieved.

Comparative Example 3

The same treatment as in Example 1 was performed except for using 6 equivalents of an aqueous 4 mol/L lithium chloride solution for the lithium ion exchange. The lithium ion-exchange ratio in the lithium ion-exchanged A-type zeolite obtained was 95 mol %, and the remaining cation was 5 mol % of sodium.

The same test as in Example 3 was performed using the zeolite above. The results are shown in Table 1. In the dehydration treatment of the nonaqueous electrolytic solution with the zeolite, water and free acid were removed from the nonaqueous electrolytic solution, but a large amount of sodium was eluted from the zeolite into the nonaqueous electrolytic solution.

Comparative Example 4

A dehydration treatment of the nonaqueous electrolytic solution was performed under the same conditions as in Example 3 by using a lithium ion-exchanged A-type zeolite (lithium ion-exchange ratio: 97 mol %) obtained in the same manner as in Comparative Example 1. The results are shown in Table 1. In the dehydration treatment of the nonaqueous electrolytic solution with the zeolite, water and free acid were removed from the nonaqueous electrolytic solution, but elution of sodium from the zeolite into the nonaqueous electrolytic solution was caused.

Comparative Example 5

A dehydration treatment of the nonaqueous electrolytic solution was performed under the same conditions as in Example 3 by using the same lithium ion-exchanged LSX zeolite (lithium ion-exchange ratio: 96.0 mol %) as in Comparative Example 2. The results are shown in Table 1.

The water removal capacity of the zeolite of Comparative Example 5 was lower than that of the lithium ion-exchanged A-type zeolite. Also, elution of sodium and potassium from the zeolite into the nonaqueous electrolytic solution was recognized. Furthermore, the free acid concentration of the nonaqueous electrolytic solution was increased by the contact with the zeolite. This increase is presumed to occur because $LiPF_6$ as the electrolyte contained in the nonaqueous electrolytic solution was decomposed due to adsorption to the zeolite.

TABLE 1

| | Water Concentration in Nonaqueous Electrolytic Solution After Dehydration Treatment (ppm) | Water Removal Percentage (%) | Free Acid Concentration in Nonaqueous Electrolytic Solution After Dehydration Treatment (ppm) | Free Acid Removal Percentage (%) | Cation Concentration in Nonaqueous Electrolytic Solution After Dehydration Treatment (ppm) | |
|---|---|---|---|---|---|---|
| | | | | | Na | K |
| Example 3 | 32.2 | 74 | 34.0 | 37 | not detected | not detected |
| Example 4 | 33.5 | 73 | 25.9 | 52 | not detected | not detected |
| Example 5 | 21.1 | 83 | 42.7 | 21 | not detected | not detected |
| Comparative Example 3 | 37.2 | 70 | 24.3 | 55 | 272 | not detected |
| Comparative Example 4 | 43.4 | 65 | 41.6 | 23 | 5 | not detected |
| Comparative Example 5 | 64.5 | 48 | 91.8 | −70*[)] | 99 | 80 |

*[)]The minus sign indicates increase of the free acid.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2009-197802) filed on Aug. 28, 2009, the contents of which are incorporated herein by way of reference.

INDUSTRIAL APPLICABILITY

The zeolite of the present invention can be utilized for dehydration of a nonaqueous electrolytic solution, particularly, can be utilized for the purpose of dehydrating an electrolytic solution used in a lithium ion battery, a lithium ion capacitor or the like. Accordingly, the industrial value of the present invention is evident.

The invention claimed is:

1. A zeolite shaped body configured for treatment of a nonaqueous electrolytic solution, comprising:
    a zeolite for treatment of a nonaqueous electrolytic solution, the zeolite containing an ion-exchangeable cation, wherein from 97.5 to 99.5 mol % of the ion-exchangeable cation in the zeolite is ion-exchanged with lithium,
    the shaped body has a shape that is spherical, cylindrical, trefoil, elliptical or a hollow shape,
    the shaped body is from 0.3 to 5 mm in diameter, and
    the zeolite is an A-type zeolite having a pore size about 6 Å or less.

2. The zeolite shaped body for treatment of a nonaqueous electrolytic solution as claimed in claim 1, wherein from 98.0 to 99.0 mol % of the ion-exchangeable cation in the zeolite is ion-exchanged with lithium.

3. The zeolite shaped body for treatment of a nonaqueous electrolytic solution as claimed in claim 1, obtained by shaping the zeolite for treatment of a nonaqueous electrolytic solution.

4. The zeolite shaped body for treatment of a nonaqueous electrolytic solution as claimed in claim 1, containing 95 wt % or more of said zeolite for treatment of a nonaqueous electrolytic solution.

5. A production method of a nonaqueous electrolytic solution, comprising: contacting a nonaqueous electrolytic solution-with the zeolite shaped body as described in claim 1.

6. A lithium battery comprising: the zeolite shaped body for treatment of a nonaqueous electrolytic solution as described in claim 1; and a nonaqueous electrolytic solution.

* * * * *